United States Patent
Dening

(10) Patent No.: US 7,336,056 B1
(45) Date of Patent: Feb. 26, 2008

(54) SWITCHING POWER CONVERTER THAT SUPPORTS BOTH A BOOST MODE OF OPERATION AND A BUCK MODE OF OPERATION USING A COMMON DUTY-CYCLE TIMING SIGNAL

(75) Inventor: David C. Dening, Stokesdale, NC (US)

(73) Assignee: RF Micro Devices, Inc., Greensboro, NC (US)

( * ) Notice: Subject to any disclaimer, the term of this patent is extended or adjusted under 35 U.S.C. 154(b) by 0 days.

(21) Appl. No.: 11/619,892

(22) Filed: Jan. 4, 2007

(51) Int. Cl.
G05F 1/10 (2006.01)
G05F 1/652 (2006.01)
G05F 1/24 (2006.01)

(52) U.S. Cl. .................. 323/222; 323/259; 323/284

(58) Field of Classification Search ........... 323/222, 323/282, 284, 286, 259
See application file for complete search history.

(56) References Cited

U.S. PATENT DOCUMENTS

| | | | | |
|---|---|---|---|---|
| 5,818,207 A * | 10/1998 | Hwang | ................ | 323/288 |
| 5,949,224 A * | 9/1999 | Barkaro | ................ | 323/282 |
| 5,973,944 A * | 10/1999 | Nork | ................ | 363/60 |
| 5,982,604 A * | 11/1999 | Kojima et al. | ................ | 361/159 |
| 6,166,527 A * | 12/2000 | Dwelley et al. | ............ | 323/222 |
| 6,348,781 B1 | 2/2002 | Midya et al. | | |
| 6,677,734 B2 * | 1/2004 | Rothleitner et al. | ........ | 323/259 |
| 7,242,169 B2 * | 7/2007 | Kanamori et al. | .......... | 323/222 |
| 7,268,525 B2 * | 9/2007 | Ishii et al. | ................ | 323/282 |
| 2002/0140410 A1 * | 10/2002 | Rothleitner et al. | ........ | 323/282 |

OTHER PUBLICATIONS

Midya, Pallab, "Buck or Boost Tracking Power Converter," IEEE Power Electronic Letters, Dec. 2004, pp. 131-134, vol. 2, No. 4, IEEE.

* cited by examiner

Primary Examiner—Bao Q. Vu
(74) Attorney, Agent, or Firm—Withrow & Terranova, PLLC

(57) ABSTRACT

The present invention is a switching power converter that supports both a boost mode of operation and a buck mode of operation, uses one energy storage element, transitions smoothly between boosting and bucking, and avoids simultaneous boosting and bucking. The switching power converter uses a common duty-cycle timing signal and a common duty-cycle setpoint signal to provide a smooth transition between boosting and bucking, and to eliminate overlap between boosting and bucking. A voltage input error integrator is used to integrate out errors between an output voltage and a setpoint voltage to provide the common duty-cycle setpoint signal. Duty-cycle error integrators are used to integrate out errors between the common duty-cycle setpoint signal and the actual duty-cycle of either the buck converter or the boost converter. Non-overlapping boost operating and buck operating ranges are provided by the common duty-cycle setpoint signal.

20 Claims, 14 Drawing Sheets

US 7,336,056 B1

SWITCHING POWER CONVERTER THAT SUPPORTS BOTH A BOOST MODE OF OPERATION AND A BUCK MODE OF OPERATION USING A COMMON DUTY-CYCLE TIMING SIGNAL

FIELD OF THE INVENTION

The present invention relates to direct current (DC-to-DC) switching power converters, which may be used in battery powered devices.

BACKGROUND OF THE INVENTION

DC-to-DC switching power converters are often used when a system needing a regulated power supply is powered from an unregulated DC source of power, or a regulated DC source of power at a different voltage. Typically, switching power converters are used when either the output voltage is higher than the input voltage, or the input voltage is higher than the output voltage, but not both. However, some applications require a switching power converter that can supply an output voltage that may be either higher or lower than an input voltage. One example is a battery powered system needing a regulated supply voltage at 3 volts DC. The battery supplying the battery powered system may be a lithium battery having an output voltage that varies from 3.3 volts DC down to 2.5 volts DC. A switching power converter that has an output voltage higher than the input voltage may be referred to as a boost converter. A switching power converter that has an output voltage lower than the input voltage may be referred to as a buck converter. By cascading a buck converter and a boost converter, a switching power converter can be created that can supply an output voltage that may be either higher or lower than an input voltage.

A switching power converter typically operates with a switching frequency. During each cycle of the switching frequency, an energy storage element, such as an inductor, is switched to receive power from an input power source for one portion of the cycle. For another portion of the cycle, the energy storage element is switched to provide some of its stored energy to downstream circuitry. The percentage of the cycle that the energy storage element is switched to receive power is known as the duty-cycle, which is varied to regulate the output of the switching power converter.

A switching power converter that supports both a boost mode of operation and a buck mode of operation may be arranged with a DC power source feeding a buck power converter, which feeds a boost power converter that provides a DC output. Alternatively, the switching power converter may be arranged with the DC power source feeding the boost power converter, which feeds the buck power converter that provides the DC output. This alternate arrangement may require two energy storage elements, as claimed in U.S. Pat. No. 6,348,781; however, an arrangement using a single energy storage element may provide a simpler, smaller, and more energy efficient solution. Existing designs may use separate timing and control circuitry for buck circuitry and boost circuitry; therefore, one problem facing such a switching power converter is operating when the input voltage is nearly equal to the output voltage. Smooth transitioning between boosting and bucking may be unattainable with some designs. If both the boost power converter and the buck power converter are active at the same time, unstable, inefficient, or noisy behaviors may result. Thus, there is a need for a switching power converter that supports both a boost mode of operation and a buck mode of operation, uses one energy storage element, transitions smoothly between boosting and bucking, and avoids simultaneous boosting and bucking.

SUMMARY OF THE INVENTION

The present invention is a switching power converter that supports both a boost mode of operation and a buck mode of operation, uses one energy storage element, transitions smoothly between boosting and bucking, and avoids simultaneous boosting and bucking. The switching power converter uses a common duty-cycle timing signal and a common duty-cycle setpoint signal to provide a smooth transition between boosting and bucking, and to eliminate overlap between boosting and bucking. A voltage input error integrator is used to integrate out errors between an output voltage and a setpoint voltage to provide the common duty-cycle setpoint signal. Duty-cycle error integrators are used to integrate out errors between the common duty-cycle setpoint signal and the actual duty-cycle of either the buck converter or the boost converter. Non-overlapping boost and buck operating ranges are provided by the common duty-cycle setpoint signal.

In one embodiment of the present invention, the energy storage element is an inductor, the common duty-cycle timing signal is a ramp signal, and a pulse signal provides timing to start each switching, or control cycle. Offset error circuitry may be included in the buck converter, the boost converter, or both, to eliminate overlap between boosting and bucking. Switching elements may include diode elements, transistor elements, metal oxide semiconductor (MOS) transistor elements, or any combination thereof. The present invention may be used in a battery powered system to provide regulated power to the system. Low pass filtering may be added to the output of the switching power converter to reduce ripple, switching transients, or noise.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIG. 1 illustrates one embodiment of the present invention, which is a switching power converter that supports both a boost mode of operation and a buck mode of operation.

FIG. 2 adds a signal generator and a first low pass filter to the switching power converter illustrated in FIG. 1.

FIG. 3 shows details of the control circuitry illustrated in FIG. 1.

FIGS. 4A, 4B, 5A, and 5B are graphs showing interactions between major signals of the switching power converter illustrated in FIG. 3.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention is a switching power converter that supports both a boost mode of operation and a buck mode of operation, uses one energy storage element, transitions smoothly between boosting and bucking, and avoids simultaneous boosting and bucking. The switching power converter uses a common duty-cycle timing signal and a common duty-cycle setpoint signal to provide a smooth transition between boosting and bucking, and to eliminate overlap between boosting and bucking. A voltage input error integrator is used to integrate out errors between an output voltage and a setpoint voltage to provide the common duty-cycle setpoint signal. Duty-cycle error integrators are used to integrate out errors between the common duty-cycle setpoint signal and the actual duty-cycle of either the buck converter or the boost converter. Non-overlapping boost operating and buck operating ranges are provided by the common duty-cycle setpoint signal.

In one embodiment of the present invention, the energy storage element is an inductor, the common duty-cycle timing signal is a ramp signal, and a pulse signal provides timing to start each switching, or control cycle. Offset error circuitry may be included in the buck converter, the boost converter, or both, to eliminate overlap between boosting and bucking. Switching elements may include diode elements, transistor elements, metal oxide semiconductor (MOS) transistor elements, or any combination thereof. The present invention may be used in a battery powered system to provide regulated power to the system. Low pass filtering may be added to the output of the switching power converter to reduce ripple, switching transients, noise, or any combination thereof.

Figure 1:
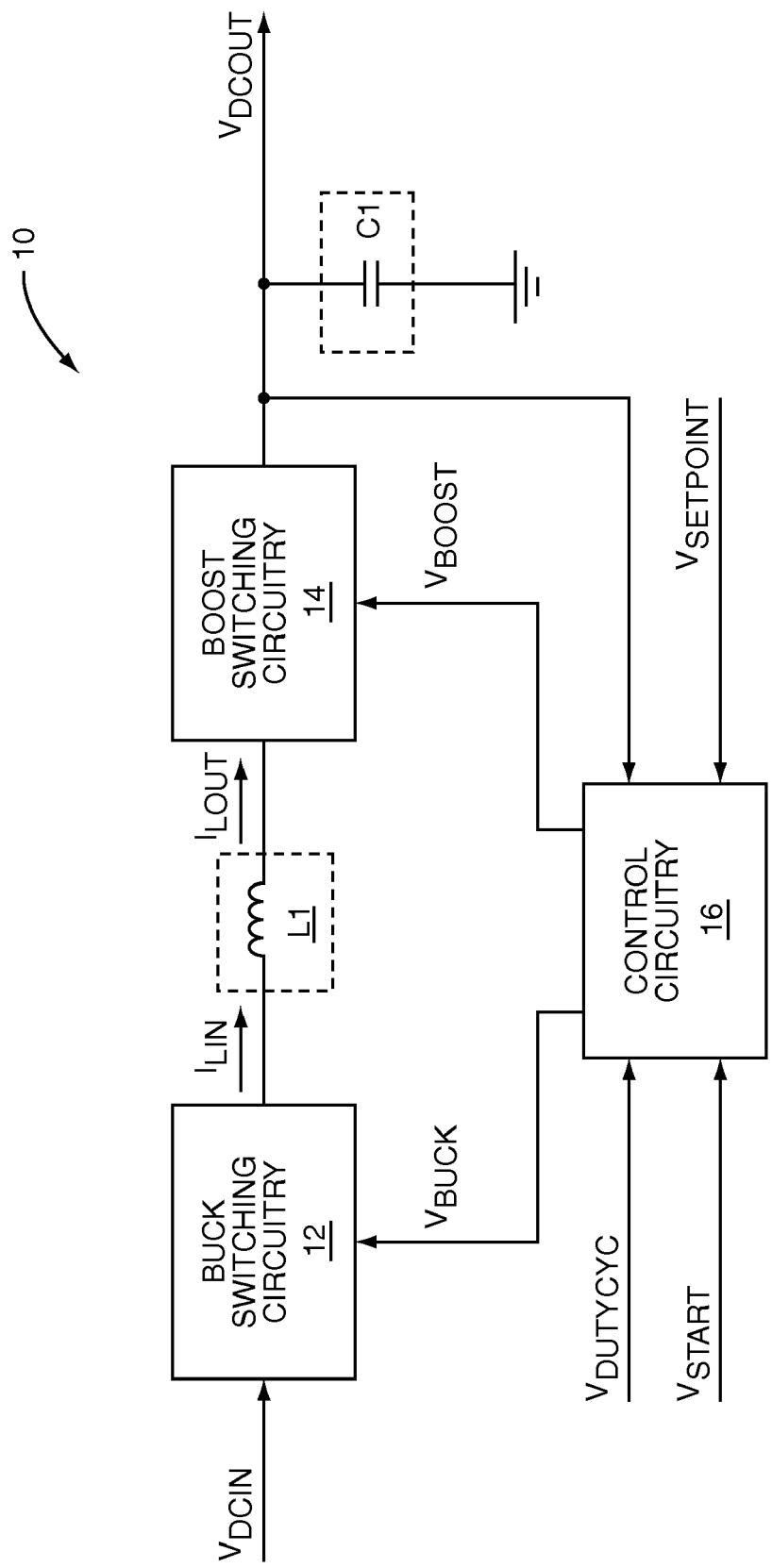

FIG. 1 illustrates one embodiment of the present invention, which is a switching power converter 10 that supports both a boost mode of operation and a buck mode of operation. Buck switching circuitry 12 receives a DC input signal $V_{DCIN}$ and a buck switching signal $V_{BUCK}$, which are used to switch an inductor input current $I_{LIN}$ to an inductor L1. The inductor L1 provides an inductor output current $I_{LOUT}$, which is equal to the inductor input current $I_{LIN}$, to boost switching circuitry 14. The boost switching circuitry 14 receives a boost switching signal $V_{BOOST}$, which is used to switch the inductor output current $I_{LOUT}$ to provide a DC output signal $V_{DCOUT}$. A filter capacitor C1 is used to filter the inductor output current $I_{LOUT}$. Control circuitry 16 receives the DC output signal $V_{DCOUT}$, a DC output setpoint signal $V_{SETPOINT}$, a duty-cycle timing signal $V_{DUTYCYC}$, and a cycle start signal $V_{START}$, and provides the buck switching signal $V_{BUCK}$ and the boost switching signal $V_{BOOST}$, which are synchronized with the duty-cycle timing signal $V_{DUTYCYC}$ and the cycle start signal $V_{START}$. Duty-cycles of the buck switching signal $V_{BUCK}$ and the boost switching signal $V_{BOOST}$ are based on the DC output signal $V_{DCOUT}$ and the DC output setpoint signal $V_{SETPOINT}$.

Figure 2:
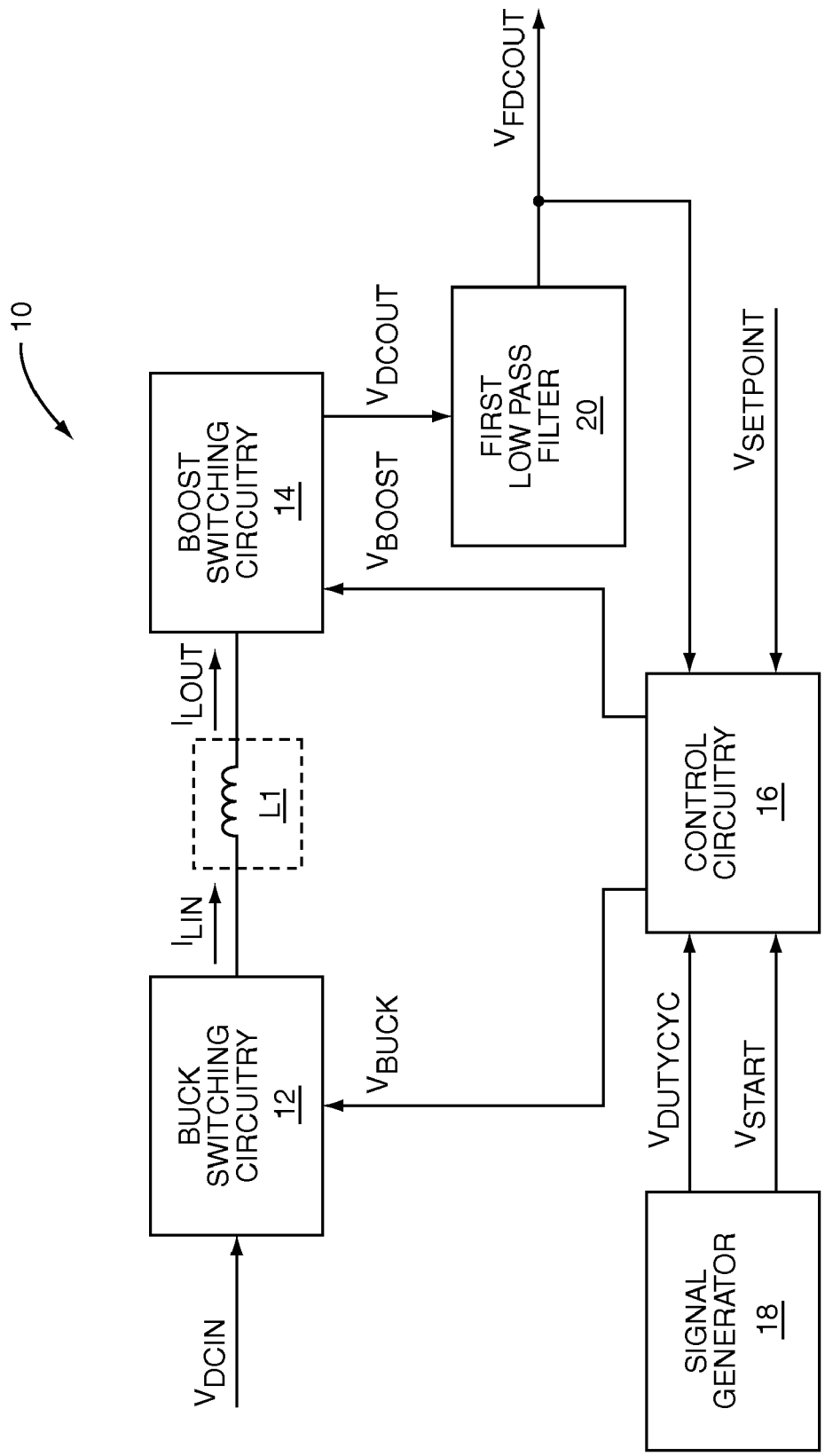

FIG. 2 adds a signal generator 18 and a first low pass filter 20 to the switching power converter 10 illustrated in FIG. 1. For simplicity, the filter capacitor C1 is not shown. The signal generator 18 provides the duty-cycle timing signal $V_{DUTYCYC}$ and the cycle start signal $V_{START}$. The first low pass filter 20 filters the DC output signal $V_{DCOUT}$ to remove ripple, switching transients, and noise to provide a filtered DC output signal $V_{FDCOUT}$, which may be provided to the control circuitry 16 in place of the DC output signal $V_{DCOUT}$.

Figure 3:
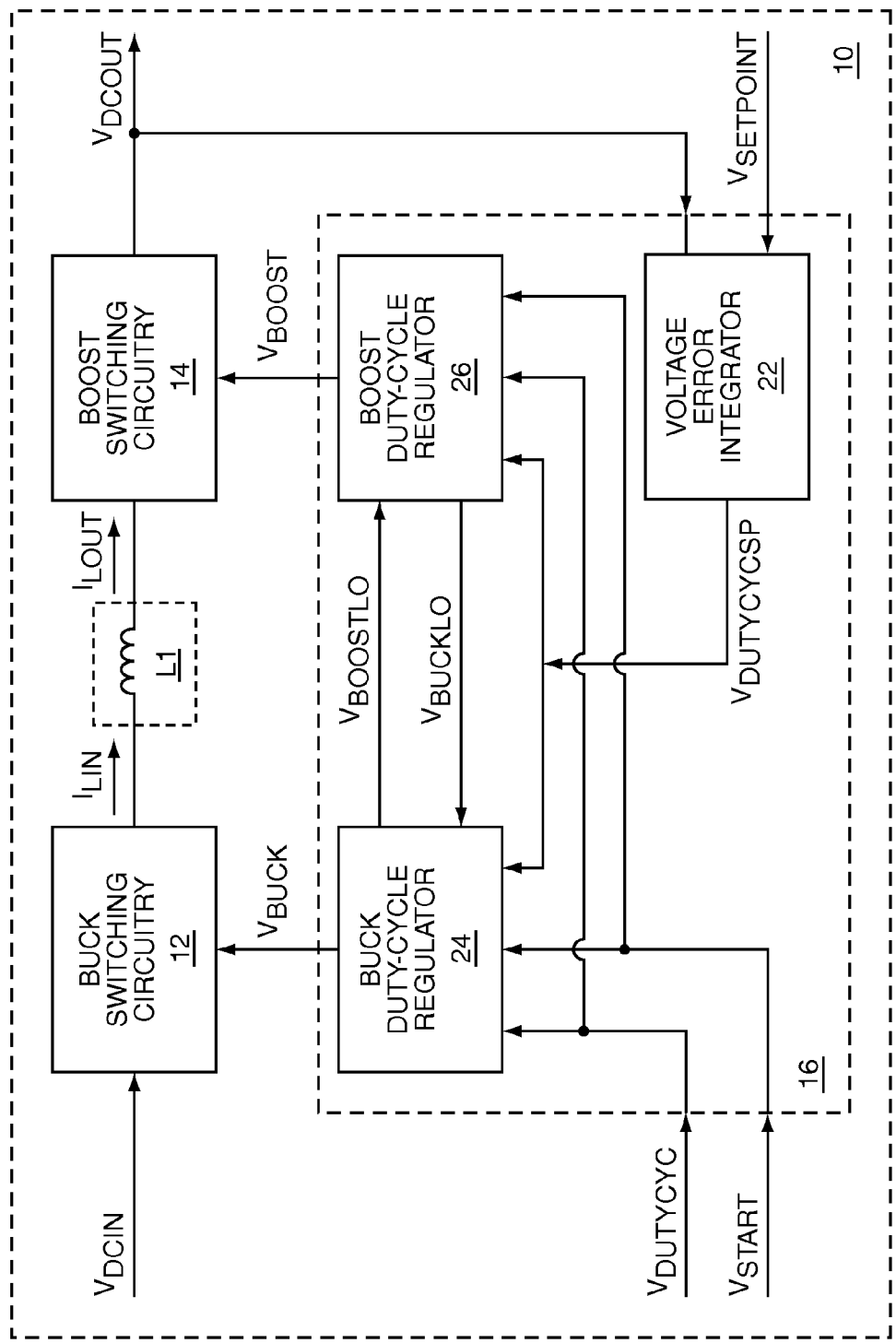

FIG. 3 shows details of the control circuitry 16 illustrated in FIG. 1. For simplicity, the filter capacitor C1 is not shown. A voltage error integrator 22 receives the DC output signal $V_{DCOUT}$ and the DC output setpoint signal $V_{SETPOINT}$, which are used to provide a duty-cycle setpoint signal $V_{DUTYCYCSP}$. The duty-cycle setpoint signal $V_{DUTYCYCSP}$ provides a boost duty-cycle operating range and a buck duty-cycle operating range that do not overlap; therefore, either the buck switching circuitry 12 is active or the boost switching circuitry 14 is active, but not simultaneously. The duty-cycle setpoint signal $V_{DUTYCYCSP}$ provides a duty-cycle setpoint that regulates the switching power converter 10 such that the DC output signal $V_{DCOUT}$ maintains a proper relationship with the DC output setpoint signal $V_{SETPOINT}$. A buck duty-cycle regulator 24 receives the duty-cycle setpoint signal $V_{DUTYCYCSP}$, the duty-cycle timing signal $V_{DUTYCYC}$, the cycle start signal $V_{START}$, and a buck lock-out signal $V_{BUCKLO}$. The buck duty-cycle regulator 24 provides the buck switching signal $V_{BUCK}$. If the boost switching signal $V_{BOOST}$ is active, the buck lock-out signal $V_{BUCKLO}$ prevents the buck switching signal $V_{BUCK}$ from going active. Likewise, A boost duty-cycle regulator 26 receives the duty-cycle setpoint signal $V_{DUTYCYCSP}$, the duty-cycle timing signal $V_{DUTYCYC}$, the cycle start signal $V_{START}$, and a boost lock-out signal $V_{BOOSTLO}$. The boost duty-cycle regulator 26 provides the boost switching signal $V_{BOOST}$. If the buck switching signal $V_{BUCK}$ is active, the boost lock-out signal $V_{BOOSTLO}$ prevents the boost switching signal $V_{BOOST}$ from going active.

Figure 4:
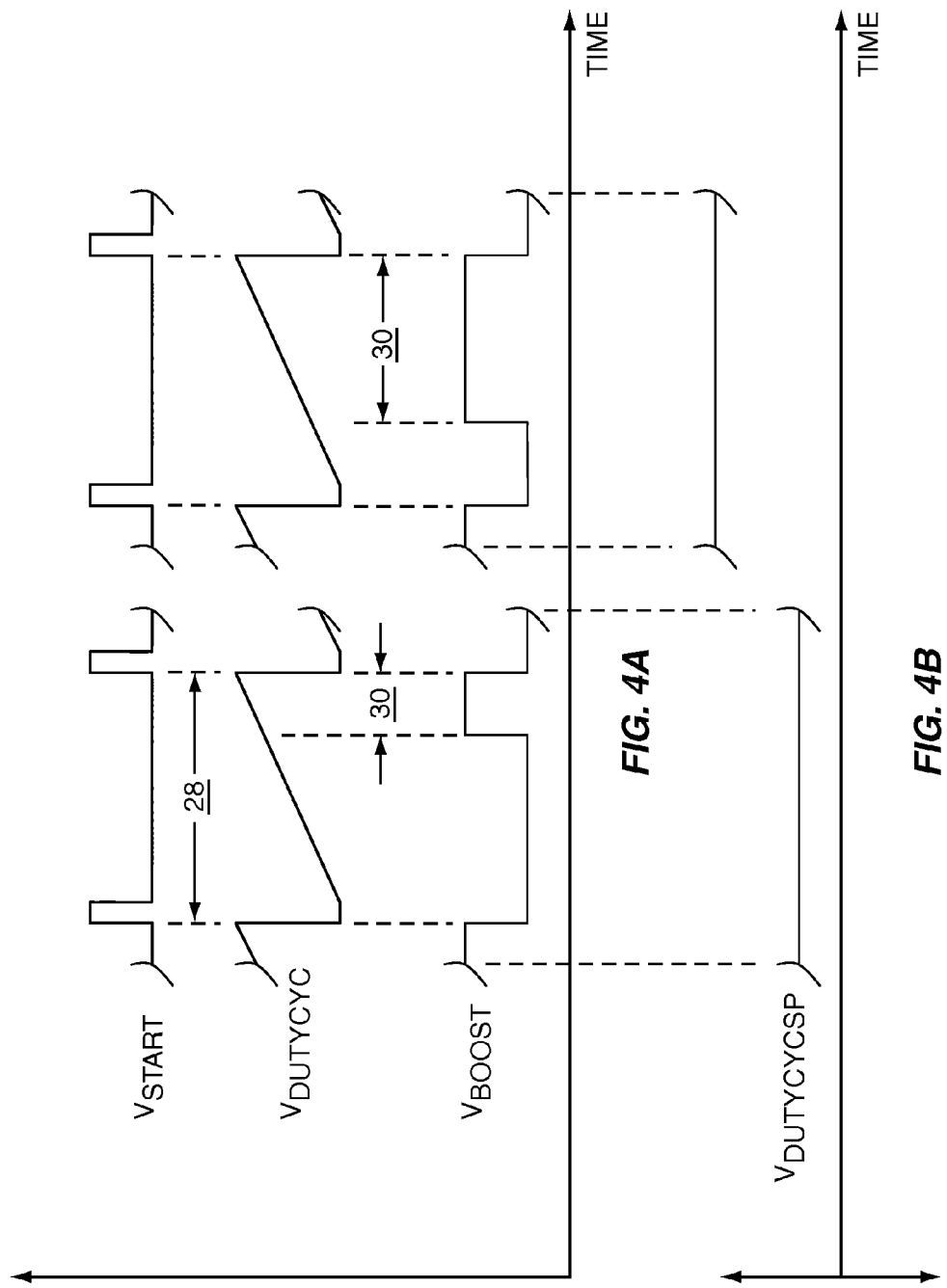

FIG. 4A is a graph showing the timing relationships between the duty-cycle timing signal $V_{DUTYCYC}$, the cycle start signal $V_{START}$, and the boost switching signal $V_{BOOST}$. A positive pulse from the cycle start signal $V_{START}$ synchronizes the start of a control cycle. The duration of the control cycle is called a control cycle period 28. The duty-cycle timing signal $V_{DUTYCYC}$, which in this embodiment is a ramp signal, is reset to a "low" state. The boost switching signal $V_{BOOST}$ is reset to an inactive state. The duty-cycle timing signal $V_{DUTYCYC}$ ramps with a positive slope for the remainder of the control cycle. Once the duty-cycle timing signal $V_{DUTYCYC}$ reaches a threshold, which is based on the duty-cycle setpoint signal $V_{DUTYCYCSP}$ as illustrated in FIG. 4B, the boost switching signal $V_{BOOST}$ switches to an active state for the remainder of the control cycle, called a boost active period 30. The boost duty-cycle is equal to the boost active period 30 divided by the control cycle period 28. As the duty-cycle setpoint signal $V_{DUTYCYCSP}$ increases, the boost duty-cycle increases. If the duty-cycle setpoint signal $V_{DUTYCYCSP}$ is zero or negative, then the boost switching signal $V_{BOOST}$ never switches to the active state.

Figure 5:
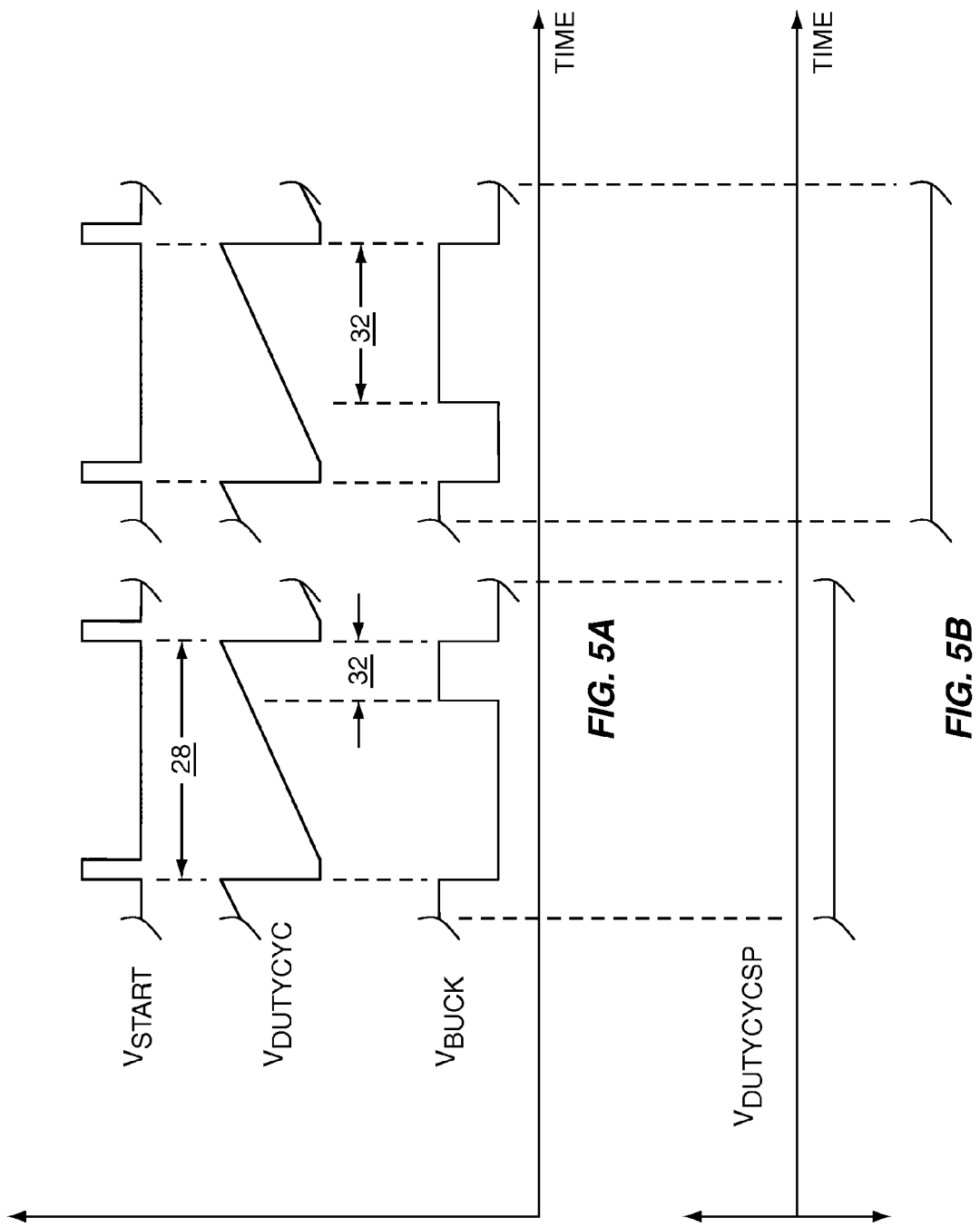

FIG. 5A is a graph showing the timing relationships between the duty-cycle timing signal $V_{DUTYCYC}$, the cycle start signal $V_{START}$, and the buck switching signal $V_{BUCK}$. A positive pulse from the cycle start signal $V_{START}$ synchronizes the start of the control cycle. The duty-cycle timing signal $V_{DUTYCYC}$ is reset to a "low" state. The buck switching signal $V_{BUCK}$ is reset to an inactive state. The duty-cycle timing signal $V_{DUTYCYC}$ ramps with a positive slope for the remainder of the control cycle. Once the duty-cycle timing signal $V_{DUTYCYC}$ reaches a threshold, which is based on the duty-cycle setpoint signal $V_{DUTYCYCSP}$ as illustrated in FIG. 5B, the buck switching signal $V_{BUCK}$ switches to an active state for the remainder of the control cycle, called a buck active period 32. The buck duty-cycle is equal to the buck active period 32 divided by the control cycle period 28. As the duty-cycle setpoint signal $V_{DUTYCYCSP}$ becomes more negative, the buck duty-cycle increases. If the duty-cycle setpoint signal $V_{DUTYCYCSP}$ is zero or positive, then the buck switching signal $V_{BUCK}$ never switches to the active state.

Figure 6:
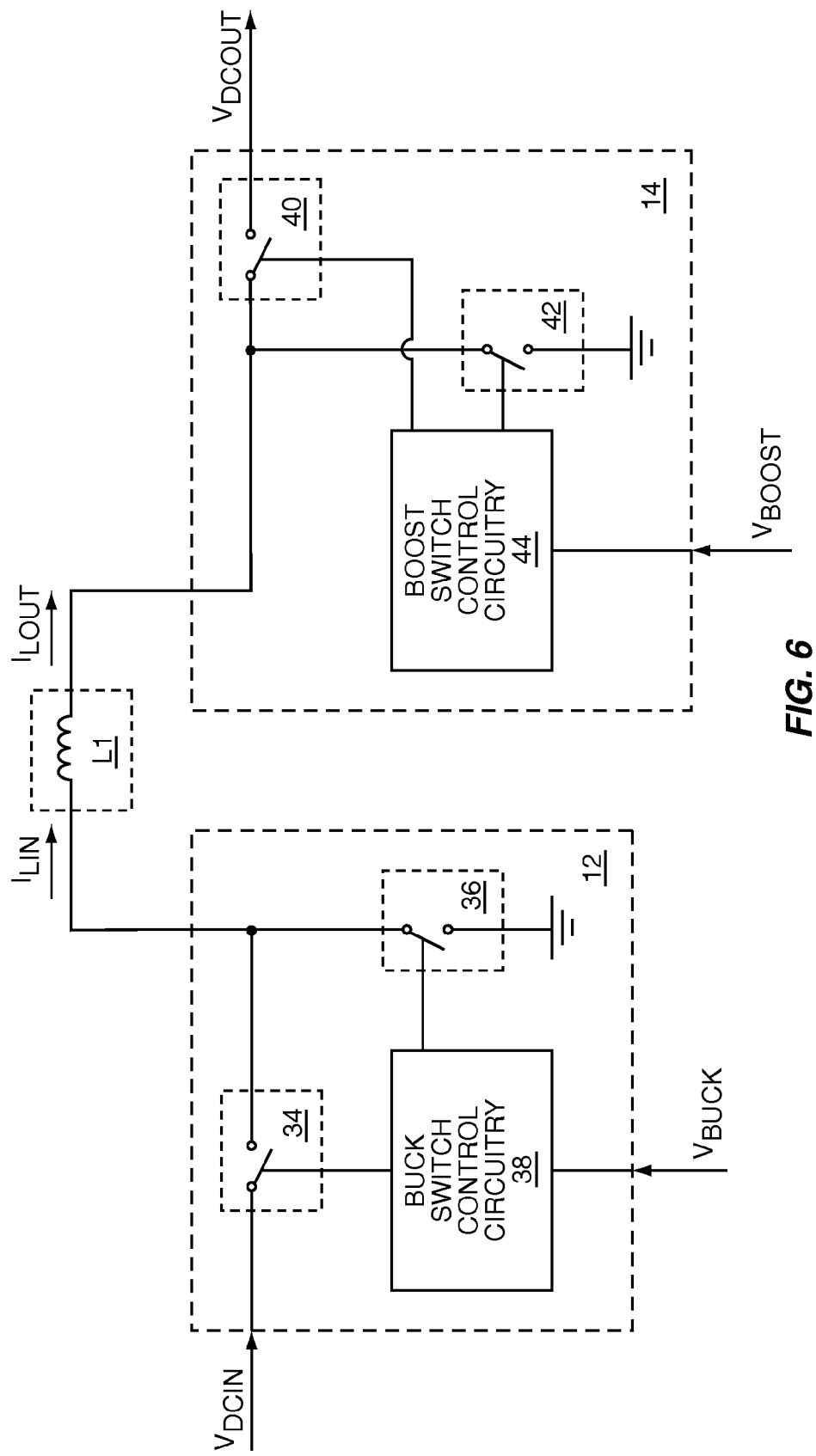
FIG. 6 shows details of the buck switching circuitry and the boost switching circuitry illustrated in FIG. 1.

FIG. 6 shows details of the buck switching circuitry 12 and the boost switching circuitry 14. The buck switching circuitry 12 includes a first buck switch 34 that receives the DC input signal $V_{DCIN}$ and is coupled to the inductor L1 and a second buck switch 36. The second buck switch 36 is also coupled to ground. Buck switch control circuitry 38 is coupled to and controls both buck switches 34, 36. The buck switch control circuitry 38 receives the buck switching signal $V_{BUCK}$. When the buck switching signal $V_{BUCK}$ is in an active state, the second buck switch 36 is closed and the first buck switch 34 is open. When the buck switching signal $V_{BUCK}$ is in an inactive state, the second buck switch 36 is open and the first buck switch 34 is closed. The buck switch control circuitry 38 makes sure the buck switches 34, 36 are never closed simultaneously.

The boost switching circuitry 14 includes a first boost switch 40 that provides the DC output signal $V_{DCOUT}$ and is coupled to the inductor L1 and a second boost switch 42. The second boost switch 42 is also coupled to ground. Boost switch control circuitry 44 is coupled to and controls both boost switches 40, 42. The boost switch control circuitry 40 receives the boost switching signal $V_{BOOST}$. When the boost switching signal $V_{BOOST}$ is in an active state, the second boost switch 42 is closed and the first boost switch 40 is open. When the boost switching signal $V_{BOOST}$ is in an inactive state, the second boost switch 42 is open and the first boost switch 40 is closed. The boost switch control circuitry 44 makes sure the boost switches 40, 42 are never closed simultaneously.

If a desired magnitude of the DC output signal $V_{DCOUT}$ is less than a magnitude of the DC input signal $V_{DCIN}$, then the switching power converter 10 may be operating in a buck mode. At the beginning of a buck mode control cycle, both switching signals $V_{BUCK}$, $V_{BOOST}$ are in an inactive state; therefore, both first switches 34, 40 are closed and both second switches 36, 42 are open. Current may flow freely between the input and output through the inductor L1. When the buck switching signal $V_{BUCK}$ becomes active, the first buck switch 34 opens and the second buck switch 36 closes, which causes the DC output signal $V_{DCOUT}$ to drive the inductor L1 with an opposite polarity to reduce the magnitude of the DC output signal $V_{DCOUT}$. Increasing duty-cycles of the buck switching signal $V_{BUCK}$ increases the percentage of the opposite polarity condition, thereby further reducing the magnitude of the DC output signal $V_{DCOUT}$.

If a desired magnitude of the DC output signal $V_{DCOUT}$ is greater than a magnitude of the DC input signal $V_{DCIN}$, then the switching power converter 10 may be operating in a boost mode. At the beginning of a boost mode control cycle, both switching signals $V_{BUCK}$, $V_{BOOST}$ are in an inactive state; therefore, both first switches 34, 40 are closed and both second switches 36, 42 are open. Current may flow freely between the input and output through the inductor L1. When the boost switching signal $V_{BOOST}$ becomes active, the first boost switch 40 opens and the second boost switch 42 closes, which causes the DC input signal $V_{DCIN}$ to be applied directly to the inductor L1, thereby building current for the remainder of the control cycle. At the end of the control cycle, when the first boost switch 40 closes and the second boost switch 42 opens, the inductor output current $I_{LOUT}$ will be provided to the output, thereby enhancing the magnitude of the DC output signal $V_{DCOUT}$. Increasing duty-cycles of the boost switching signal $V_{BOOST}$ increases the duty-cycle of the current building condition, thereby further increasing the magnitude of the DC output signal $V_{DCOUT}$.

Figure 7:
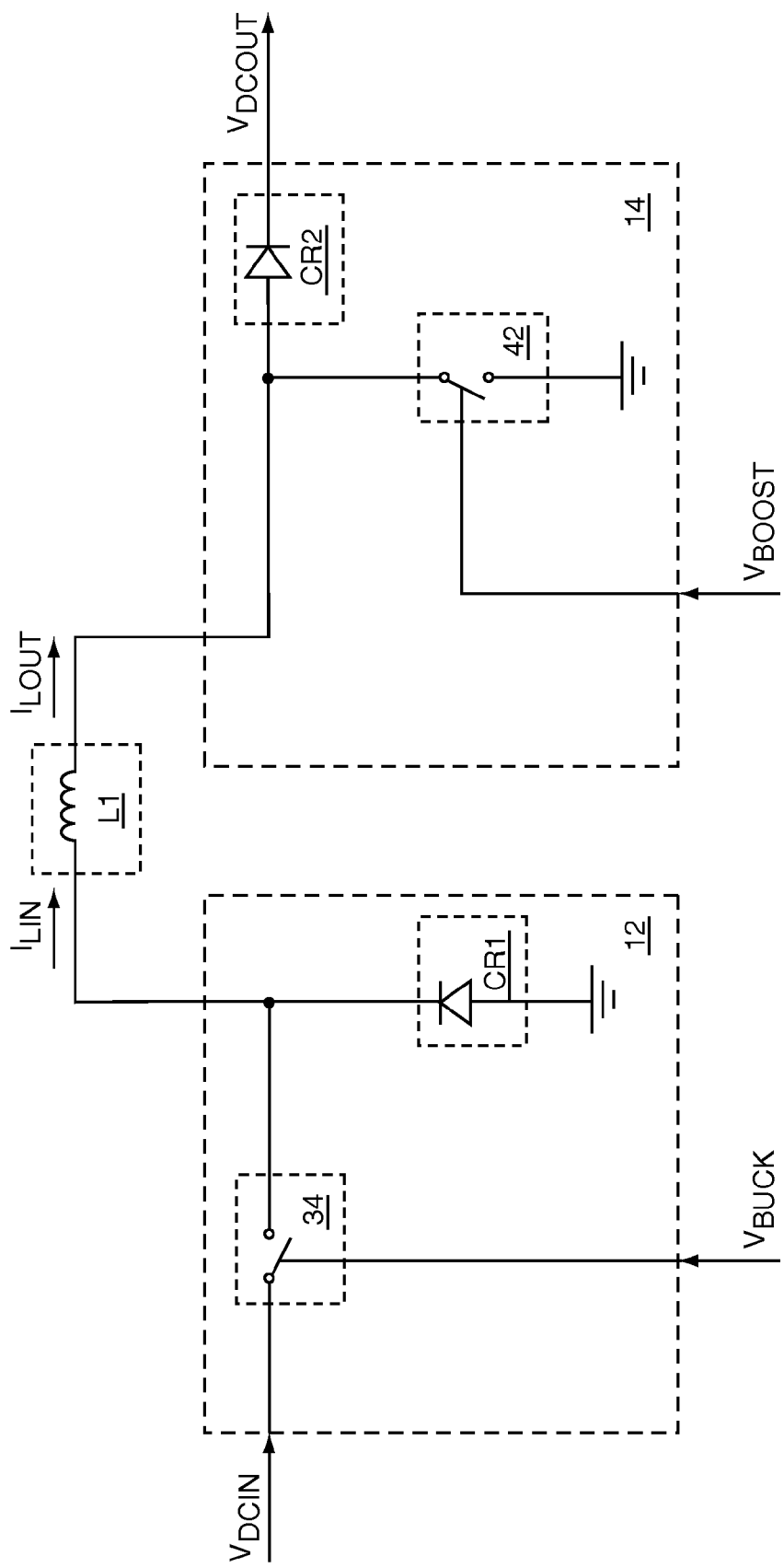
FIG. 7 shows an alternate embodiment of the buck switching circuitry and the boost switching circuitry.

FIG. 7 shows an alternate embodiment of the buck switching circuitry 12 and the boost switching circuitry 14. The second buck switch 36 is replaced with a buck diode CR1. This embodiment may allow elimination or simplification of the buck switch control circuitry 38; however, the buck diode CR1 may consume more power than the second buck switch 36. The first boost switch 40 is replaced with a boost diode CR2. This embodiment may allow elimination or simplification of the boost switch control circuitry 44; however, the boost diode CR2 may consume more power than the first boost switch 40.

Figure 8:
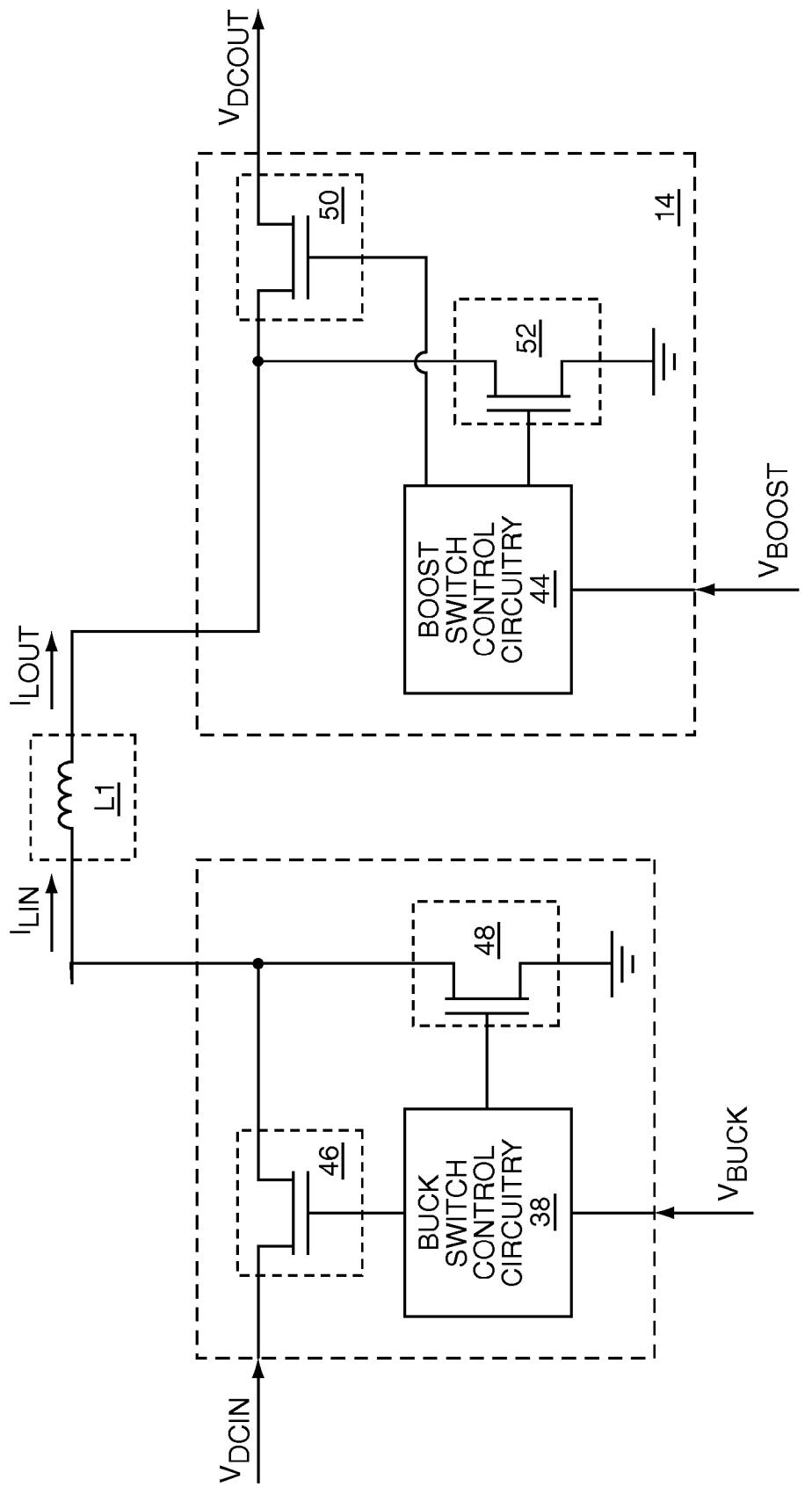
FIG. 8 shows an additional embodiment of the buck switching circuitry and the boost switching circuitry.

FIG. 8 shows an additional embodiment of the buck switching circuitry 12 and the boost switching circuitry 14. The switches 34, 36, 40, 42 are replaced with switching MOS transistor elements 46, 48, 50, 52. Other embodiments of the present invention may replace the switches 34, 36, 40, 42 with other switching transistor elements. Those skilled in the art will understand the concepts of the invention and will recognize these other embodiments as applications of these concepts. It should be understood that these concepts and applications fall within the scope of this disclosure and the accompanying claims.

Figure 9:
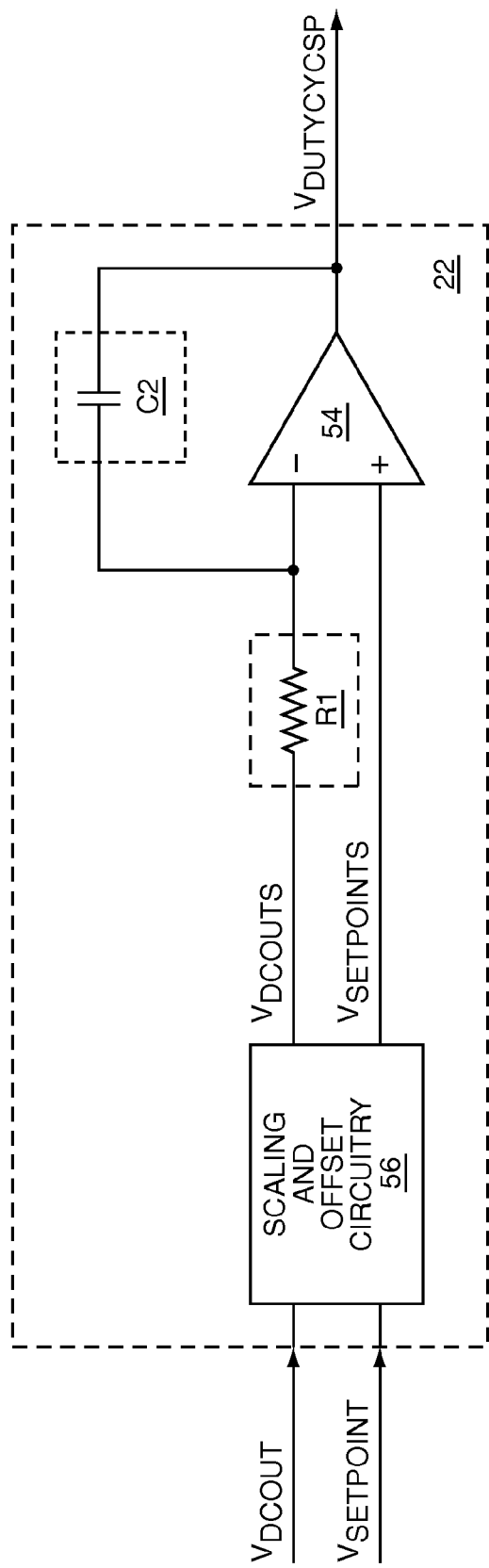
FIG. 9 shows details of the voltage error integrator illustrated in FIG. 3.

FIG. 9 shows details of the voltage error integrator 22 illustrated in FIG. 3. A voltage error operational amplifier 54 is configured as an inverting integrator. Scaling and offset circuitry 56 receives the DC output signal $V_{DCOUT}$ and the DC output setpoint signal $V_{SETPOINT}$, and scales and provides offsets to each signal as needed to provide a scaled DC output signal $V_{DCOUTS}$ and a scaled DC output setpoint signal $V_{SETPOINTS}$. A voltage error resistive element R1 receives the scaled DC output signal $V_{DCOUTS}$ and is coupled to the inverting input of the voltage error operational amplifier 54. A voltage error capacitive element C2 is coupled between the inverting input and the output of the voltage error operational amplifier 54. The non-inverting input of the voltage error operational amplifier 54 receives the scaled DC output setpoint signal $V_{SETPOINTS}$. The output of the voltage error operational amplifier 54 provides the duty-cycle setpoint signal $V_{DUTYCYCSP}$. Since the voltage error operational amplifier 54 is configured as an inverting integrator, any difference, or error, between the scaled DC output setpoint signal $V_{SETPOINTS}$ and the scaled DC output signal $V_{DCOUTS}$ will be integrated into the duty-cycle setpoint signal $V_{DUTYCYCSP}$ until the scaled DC output setpoint signal $V_{SETPOINTS}$ is equal to the scaled DC output signal $V_{DCOUTS}$. If the voltage error operational amplifier 54 was not configured as an integrator, then a difference, or error, between the scaled DC output setpoint signal $V_{SETPOINTS}$ and the scaled DC output signal $V_{DCOUTS}$ would be required to develop a non-zero duty-cycle setpoint signal $V_{DUTYCYCSP}$. The time constant of the voltage error integrator 22 is relatively long when compared with the control cycle period 28.

Figure 10:
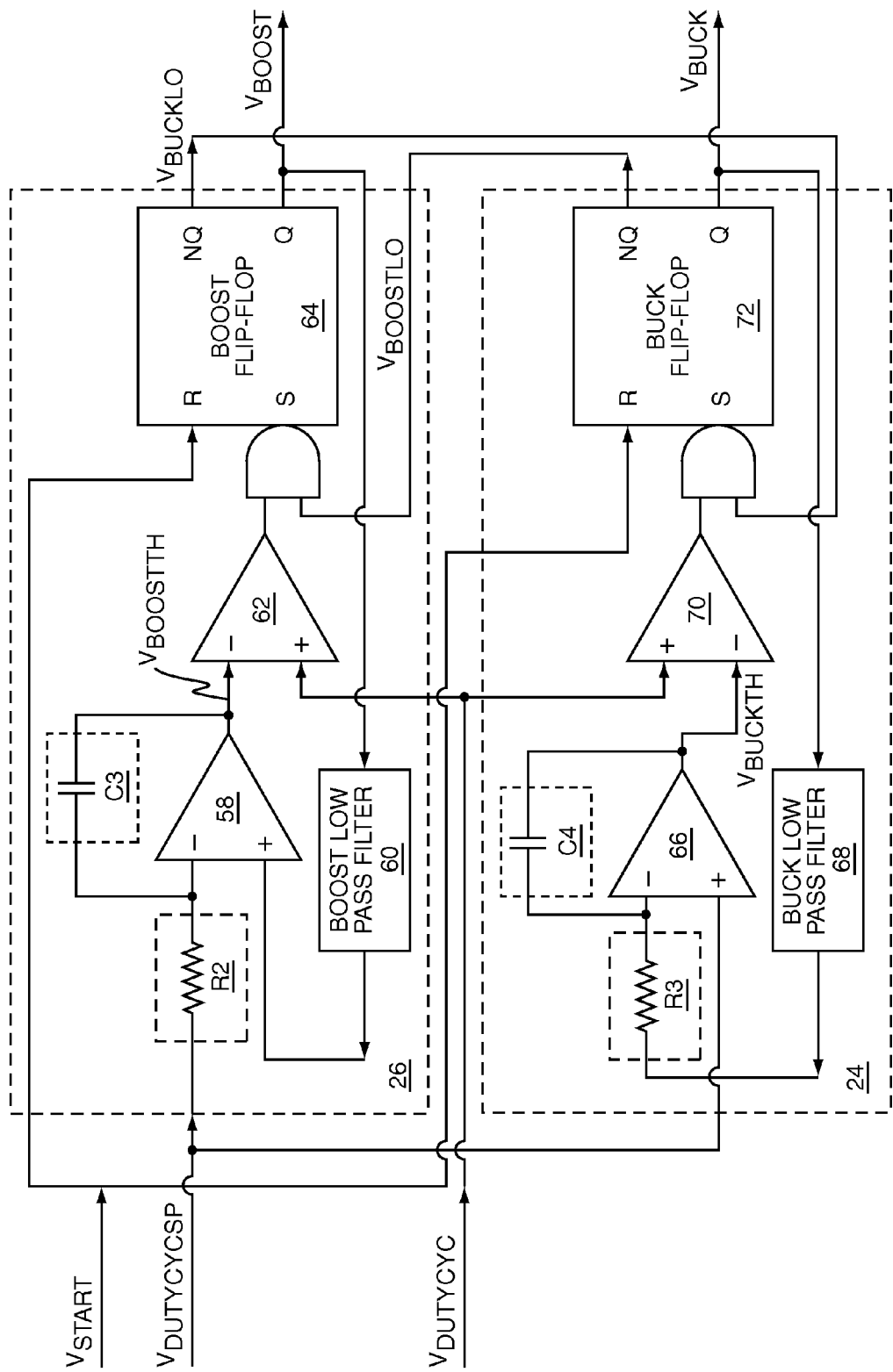
FIG. 10 shows details of the buck duty-cycle regulator and boost duty-cycle regulator illustrated in FIG. 3.

FIG. 10 shows details of the buck duty-cycle regulator 24 and the boost duty-cycle regulator 26 illustrated in FIG. 3. In the boost duty-cycle regulator 26, a boost duty-cycle error operational amplifier 58 is configured as an inverting integrator. A boost duty-cycle resistive element R2 receives the duty-cycle setpoint signal $V_{DUTYCYCSP}$ and is coupled to the inverting input of the boost duty-cycle error operational amplifier 58. A boost duty-cycle error capacitive element C3 is coupled between the inverting input and the output of the boost duty-cycle error operational amplifier 58. The non-inverting input of the boost duty-cycle error operational amplifier 58 is coupled to a boost low pass filter 60, which provides a filtered signal, called a filtered boost switching signal, that is proportional to the duty-cycle of the boost switching signal $V_{BOOST}$. The output of the boost duty-cycle error operational amplifier 58 provides a boost threshold signal $V_{BOOSTTH}$, which feeds the inverting input of a boost duty-cycle comparator 62. The non-inverting input of the boost duty-cycle comparator 62 receives the duty-cycle timing signal $V_{DUTYCYC}$. The output of the boost duty-cycle comparator 62 feeds the set input S of a boost flip-flop 64 through one input of an AND gate. The other input of the AND gate receives the boost lock-out signal $V_{BOOSTLO}$. The reset input R of the boost flip-flop 64 receives the cycle start signal $V_{START}$. The non-inverting output Q of the boost flip-flop 64 provides the boost switching signal $V_{BOOST}$. The inverting output NQ of the boost flip-flop 64 provides the buck lock-out signal $V_{BUCKLO}$.

The boost duty-cycle regulator 26 provides the boost switching signal $V_{BOOST}$, which has a regulated duty-cycle that is based on the duty-cycle setpoint signal $V_{DUTYCYCSP}$. A positive pulse from the cycle start signal $V_{START}$ synchronizes the start of the control cycle. The boost flip-flop 64 is reset, which drives the boost switching signal $V_{BOOST}$ to a low state that is its inactive state. The buck lock-out signal $V_{BUCKLO}$ is driven to a "high" state that is its inactive state; therefore the buck duty-cycle regulator 24 is not prevented from driving the buck switching signal $V_{BUCK}$ to its active state. The duty-cycle timing signal $V_{DUTYCYC}$ is reset to a "low" state, which causes the output of the boost duty-cycle comparator 62 to be driven to a "low" state, thereby driving the set input S of the boost flip-flop 64 to a "low" state that is its inactive state. The duty-cycle timing signal $V_{DUTYCYC}$ then ramps with a positive slope for the remainder of the control cycle. If the boost lock-out signal $V_{BOOSTLO}$ is in a "low" state that is its active state, then the set input S of the boost flip-flop 64 is held in a "low" state, thereby holding the boost switching signal $V_{BOOST}$ in its inactive state. Otherwise, once the duty-cycle timing signal $V_{DUTYCYC}$ reaches the same magnitude as the boost threshold signal $V_{BOOSTTH}$, the output of the boost duty-cycle comparator 62 is driven to a "high" state, thereby driving the set input S of the boost flip-flop 64 to a "high" state; therefore, the boost flip-flop 64 drives the boost switching signal $V_{BOOST}$ to a high state that is its active state. The buck lock-out signal $V_{BUCKLO}$ is driven to a "low" state that is its active state, thereby inhibiting the buck switching signal $V_{BUCK}$ from entering its active state.

Since the boost duty-cycle error operational amplifier 58 is configured as an inverting integrator, any difference, or error between the filtered boost switching signal and the duty-cycle setpoint signal $V_{DUTYCYCSP}$ will be integrated into the boost threshold signal $V_{BOOSTTH}$ until the filtered boost switching signal is equal to the duty-cycle setpoint signal $V_{DUTYCYCSP}$. If the boost duty-cycle error operational amplifier 58 was not configured as an integrator, then a difference or error between the filtered boost switching signal and the duty-cycle setpoint signal $V_{DUTYCYCSP}$ would be required to establish the required boost threshold signal $V_{BOOSTTH}$.

In the buck duty-cycle regulator 24, a buck duty-cycle error operational amplifier 66 is configured as an inverting integrator. A buck duty-cycle resistive element R3 is coupled to a buck low pass filter 68, which provides a filtered signal, called a filtered buck switching signal, that is proportional to the duty-cycle of the buck switching signal $V_{BUCK}$. The buck duty-cycle resistive element R3 is coupled to the inverting input of the buck duty-cycle error operational amplifier 66. A buck duty-cycle error capacitive element C4 is coupled between the inverting input and the output of the buck duty-cycle error operational amplifier 66. The non-inverting input of the buck duty-cycle error operational amplifier 66 receives the duty-cycle setpoint signal $V_{DUTYCYCSP}$. The output of the buck duty-cycle error operational amplifier 66 provides a buck threshold signal $V_{BUCKTH}$, which feeds the inverting input of a buck duty-cycle comparator 70. The non-inverting input of the buck duty-cycle comparator 70 receives the duty-cycle timing signal $V_{DUTYCYC}$. The output of the buck duty-cycle comparator 70 feeds the set input S of a buck flip-flop 72 through one input of an AND gate. The other input of the AND gate receives the buck lock-out signal $V_{BUCKLO}$. The reset input R of the buck flip-flop 72 receives the cycle start signal $V_{START}$. The non-inverting output Q of the buck flip-flop 72 provides the buck switching signal $V_{BUCK}$. The inverting output NQ of the buck flip-flop 72 provides the boost lock-out signal $V_{BOOSTLO}$.

The buck duty-cycle regulator 24 provides the buck switching signal $V_{BUCK}$, which has a regulated duty-cycle that is based on the duty-cycle setpoint signal $V_{DUTYCYCSP}$. A positive pulse from the cycle start signal $V_{START}$ synchronizes the start of the control cycle. The buck flip-flop 72 is reset, which drives the buck switching signal $V_{BUCK}$ to a low state that is its inactive state. The boost lock-out signal $V_{BOOSTLO}$ is driven to a "high" state that is its inactive state; therefore, the boost duty-cycle regulator 26 is not prevented from driving the boost switching signal $V_{BOOST}$ to its active state. The duty-cycle timing signal $V_{DUTYCYC}$ is reset to a "low" state, which causes the output of the buck duty-cycle comparator 70 to be driven to a "low" state, thereby driving the set input S of the buck flip-flop 72 to a "low" state that is its inactive state. The duty-cycle timing signal $V_{DUTYCYC}$ then ramps with a positive slope for the remainder of the control cycle. If the buck lock-out signal $V_{BUCKLO}$ is in a "low" state that is its active state, then the set input S of the buck flip-flop 72 is held in a "low" state, thereby holding the buck switching signal $V_{BUCK}$ in its inactive state. Otherwise, once the duty-cycle timing signal $V_{DUTYCYC}$ reaches the same magnitude as the buck threshold signal $V_{BUCKTH}$, the output of the buck duty-cycle comparator 70 is driven to a "high" state, thereby driving the set input S of the buck flip-flop 72 to a "high" state; therefore, the buck flip-flop 72 drives the buck switching signal $V_{BUCK}$ to a high state that is its active state. The boost lock-out signal $V_{BOOSTLO}$ is driven to a "low" state that is its active state, thereby inhibiting the boost switching signal $V_{BOOST}$ from entering its active state.

Since the buck duty-cycle error operational amplifier 66 is configured as an inverting integrator, any difference, or error, between the filtered buck switching signal and the duty-cycle setpoint signal $V_{DUTYCYCSP}$ will be integrated into the buck threshold signal $V_{BUCKTH}$ until the filtered buck switching signal is equal to the duty-cycle setpoint signal $V_{DUTYCYCSP}$. If the buck duty-cycle error operational amplifier 66 was not configured as an integrator, then a difference or error between the filtered buck switching signal and the duty-cycle setpoint signal $V_{DUTYCYCSP}$ would be required to establish the required buck threshold signal $V_{BUCKTH}$.

Time constants of the boost low pass filter 60, the boost duty-cycle error integrator, the buck low pass filter 68, and the buck duty-cycle error integrator are relatively long when compared with the control cycle period 28. The time constant of the voltage error integrator 22 is relatively long when compared with the time constants of the boost low pass filter 60, the boost duty-cycle error integrator, the buck low pass filter 68, and the buck duty-cycle error integrator. In one embodiment of the present invention, the time constants of the boost low pass filter 60, the boost duty-cycle error integrator, the buck low pass filter 68, and the buck duty-cycle error integrator are greater than five times the control cycle period 28. The time constant of the voltage error integrator 22 is greater than 25 times the control cycle period 28.

Figure 11:
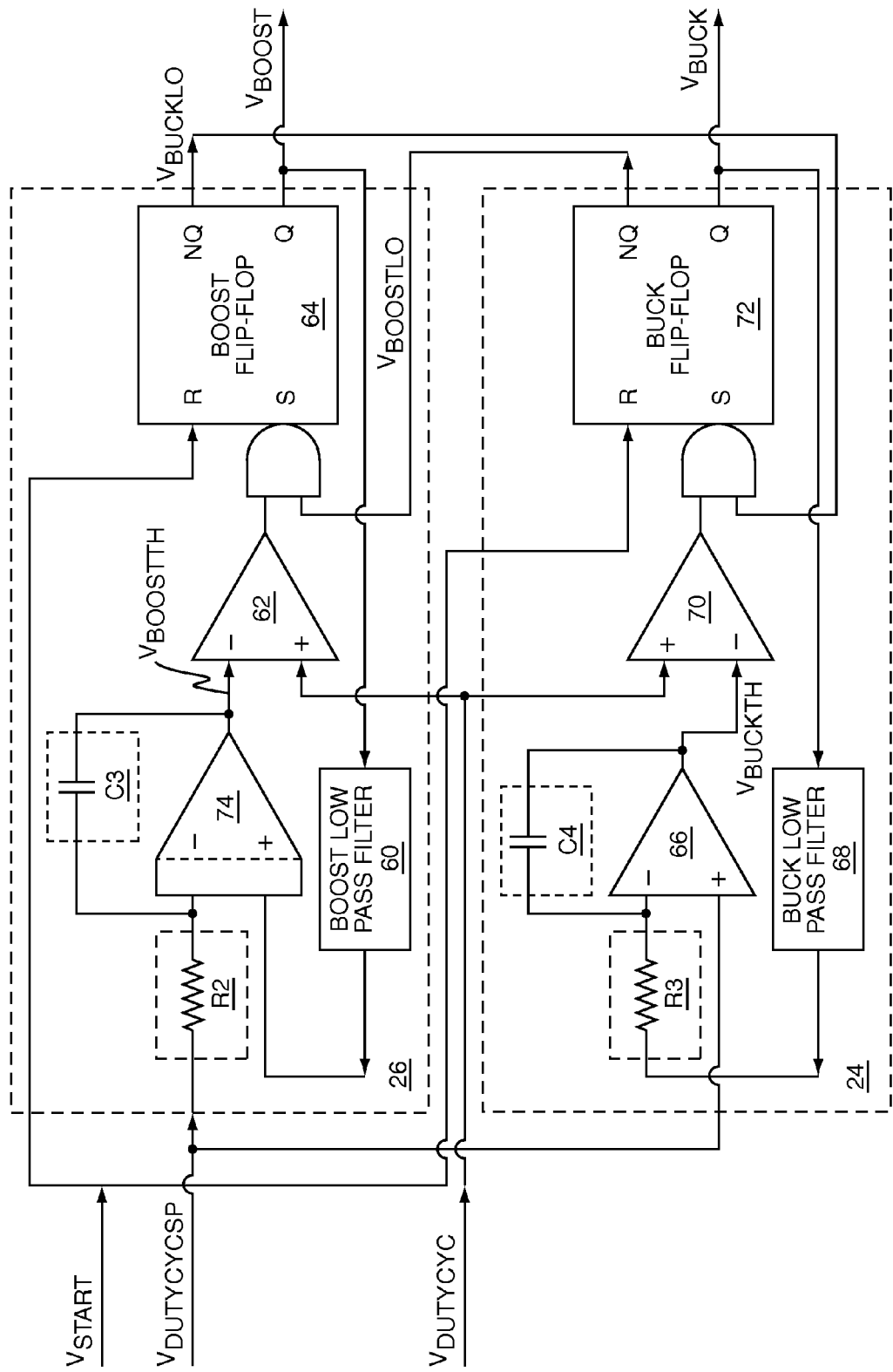
FIG. 11 shows an alternate embodiment of the boost duty-cycle regulator.
Figure 12:
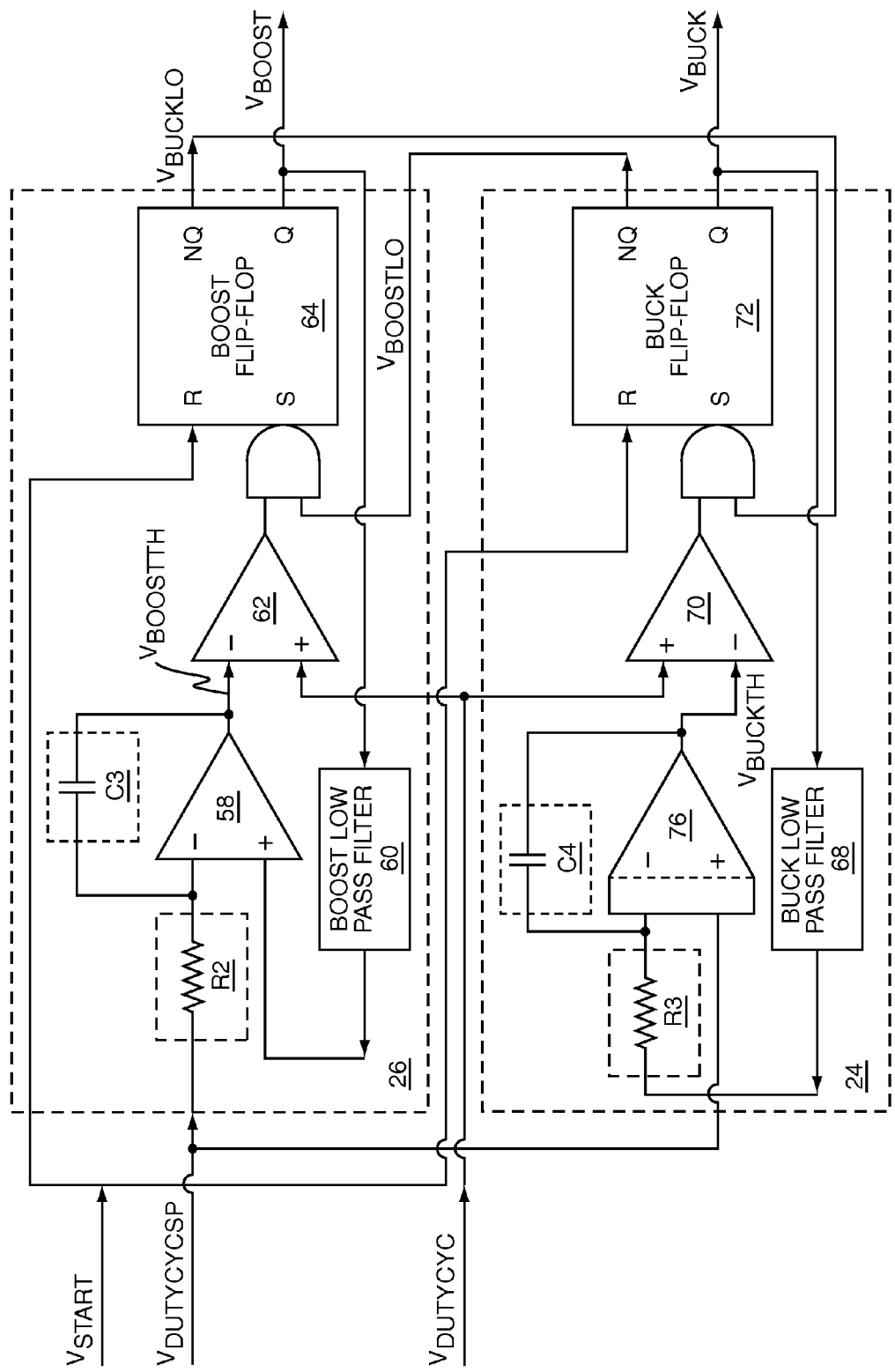
FIG. 12 shows an alternate embodiment of the buck duty-cycle regulator.
Figure 13A:
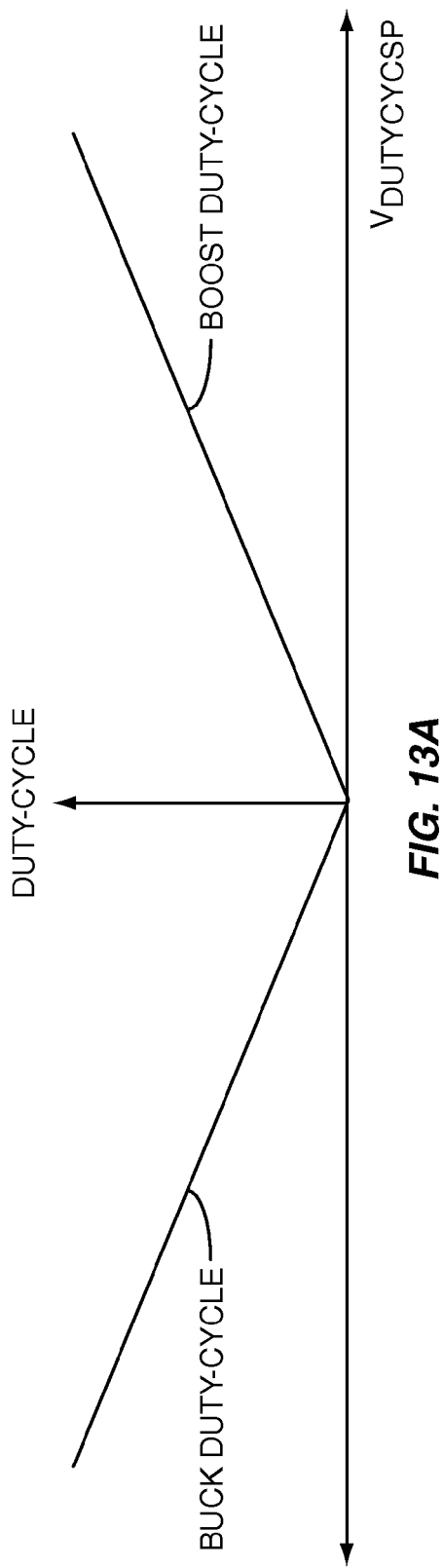
FIGS. 13A and 13B are graphs showing buck and boost operating ranges.
Figure 13B:
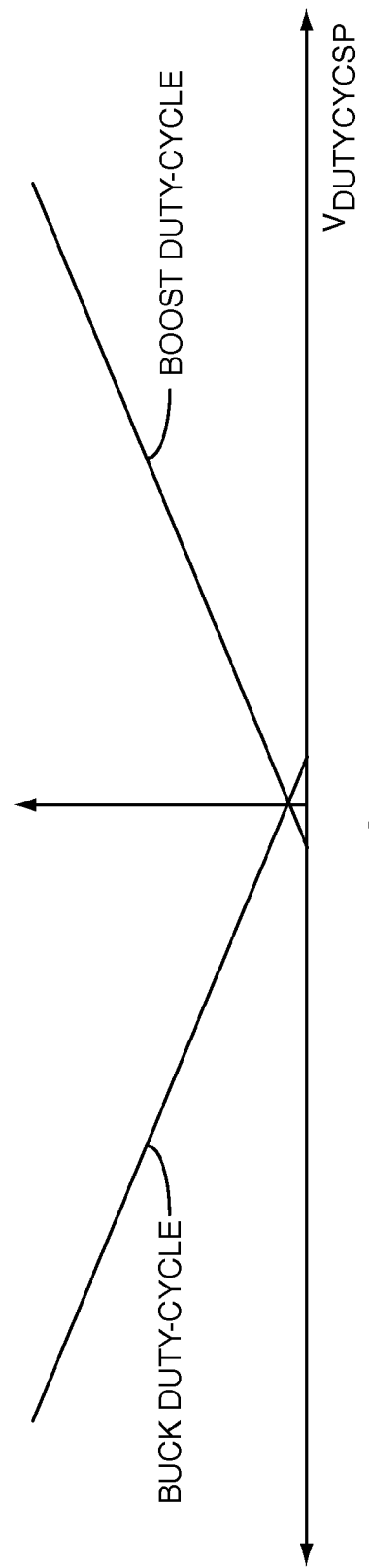

FIG. 11 shows an alternate embodiment of the boost duty-cycle regulator 26. To make sure the boost duty-cycle operating range does not overlap with the buck duty-cycle operating range, the boost duty-cycle error operational amplifier 58 is replaced with an offset error corrected boost duty-cycle error operational amplifier 74. FIG. 12 shows an alternate embodiment of the buck duty-cycle regulator 24. To make sure the buck duty-cycle operating range does not overlap with the boost duty-cycle operating range, the buck duty-cycle error operational amplifier 66 is replaced with an offset error corrected buck duty-cycle error operational amplifier 76. In an additional embodiment of the present invention, both duty-cycle error operational amplifiers 58, 66 could be replaced with offset error corrected duty-cycle error operational amplifiers 74, 76. The offset error corrected duty-cycle error operational amplifiers 74, 76 include offset error correcting circuitry to correct for input offsets or other circuit anomalies. FIGS. 13A and 13B are graphs showing buck and boost operating ranges. FIG. 13A shows desired locations of the buck and boost operating ranges without overlap. FIG. 13B shows overlap between the buck and boost operating ranges, which may require offset error corrected duty-cycle error operational amplifiers 74, 76, or some other technique to eliminate overlap. Alternate embodiments of the duty-cycle regulators 24, 26 may use different combinations of inverting inputs, non-inverting inputs, set inputs, reset inputs, inverting outputs, non-inverting outputs, active high signals, and active low signals to achieve similar functionality.

Figure 14:
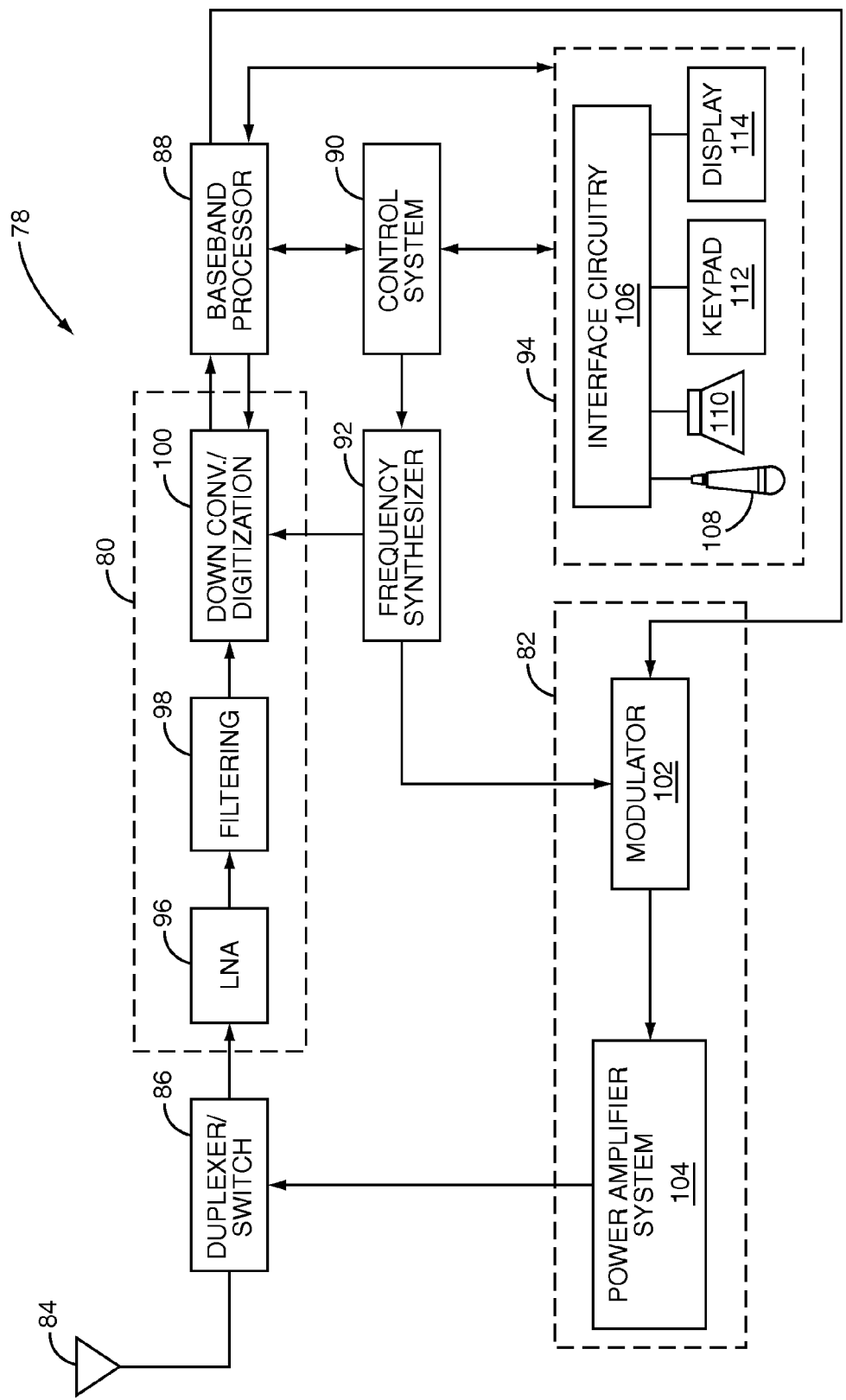
FIG. 14 shows an application example of the present invention used in a mobile terminal.

An application example of a switching power converter 10 is its inclusion in a battery powered mobile terminal to provide regulated power. The basic architecture of a mobile terminal 78 is represented in FIG. 14 and may include a receiver front end 80, a radio frequency transmitter section 82, an antenna 84, a duplexer or switch 86, a baseband processor 88, a control system 90, a frequency synthesizer 92, and an interface 94. The receiver front end 80 receives information bearing radio frequency signals from one or more remote transmitters provided by a base station. A low noise amplifier (LNA) 96 amplifies the signal. A filter circuit 98 minimizes broadband interference in the received signal, while down conversion and digitization circuitry 100 down converts the filtered, received signal to an intermediate or baseband frequency signal, which is then digitized into one or more digital streams. The receiver front end 80 typically uses one or more mixing frequencies generated by the frequency synthesizer 92. The baseband processor 88 processes the digitized received signal to extract the information or data bits conveyed in the received signal. This processing typically comprises demodulation, decoding, and error correction operations. As such, the baseband processor 88 is generally implemented in one or more digital signal processors (DSPs).

On the transmit side, the baseband processor 88 receives digitized data, which may represent voice, data, or control information, from the control system 90, which it encodes for transmission. The encoded data is output to the transmitter 82, where it is used by a modulator 102 to modulate a carrier signal that is at a desired transmit frequency. Power amplifier circuitry 104 amplifies the modulated carrier signal to a level appropriate for transmission, and delivers the amplified and modulated carrier signal to the antenna 84 through the duplexer or switch 86.

A user may interact with the mobile terminal 78 via the interface 94, which may include interface circuitry 106 associated with a microphone 108, a speaker 110, a keypad 112, and a display 114. The interface circuitry 106 typically includes analog-to-digital converters, digital-to-analog converters, amplifiers, and the like. Additionally, it may include a voice encoder/decoder, in which case it may communicate directly with the baseband processor 88. The microphone 108 will typically convert audio input, such as the user's voice, into an electrical signal, which is then digitized and passed directly or indirectly to the baseband processor 88. Audio information encoded in the received signal is recovered by the baseband processor 88, and converted by the interface circuitry 106 into an analog signal suitable for driving the speaker 110. The keypad 112 and display 114 enable the user to interact with the mobile terminal 78, input numbers to be dialed, address book information, or the like, as well as monitor call progress information.

Those skilled in the art will recognize improvements and modifications to the preferred embodiments of the present invention. All such improvements and modifications are considered within the scope of the concepts disclosed herein and the claims that follow.

What is claimed is:

1. A switching power converter comprising:
   first switching circuitry adapted to receive a DC input signal;
   second switching circuitry adapted to provide a DC output signal; and
   control circuitry adapted to:
     receive the DC output signal and a common duty-cycle timing signal;
     provide a common duty-cycle setpoint signal based on the DC output signal and an output setpoint, the common duty-cycle setpoint signal having a boost zone corresponding to a boost operating mode and a buck zone corresponding to a buck operating mode, wherein the boost zone and the buck zone do not overlap;
     when in the buck operating mode, provide a first signal having a first switching duty-cycle based on the common duty-cycle setpoint signal and the common duty-cycle timing signal to control the first switching circuitry; and when in the boost operating mode, provide a second signal having a second switching duty-cycle based on the common duty-cycle setpoint signal and the common duty-cycle timing signal to control the second switching circuitry, wherein the switching power converter substantially regulates the DC output signal based on the output setpoint.

2. The switching power converter of claim 1 further comprising:

an energy storage element having a storage input and a storage output;

the first switching circuitry coupled to the storage input and adapted to:
when in the buck operating mode, switch the storage input between the DC input signal and a common node based on the first signal; and
when in the boost operating mode, couple the storage input to the DC input signal based on the first signal; and the second switching circuitry coupled to the storage output and adapted to:
when in the boost operating mode, switch the storage output between the DC output signal and the common node based on the second signal; and
when in the buck operating mode, couple the storage output to the DC output signal based on the second signal.

3. The switching power converter of claim 2 wherein the energy storage element comprises an inductive element.

4. The switching power converter of claim 2 wherein the common duty-cycle timing signal comprises a plurality of timing cycles, wherein each timing cycle has a first part having a positive approximately linear slope and a second part having a negative approximately linear slope.

5. The switching power converter of claim 2 wherein the control circuitry is further adapted to receive a common cycle start signal having a first frequency such that the common duty-cycle timing signal has the first frequency.

6. The switching power converter of claim 2 wherein the first signal comprises an active buck state and an inactive buck state, and the second signal comprises an active boost state and an inactive boost state, such that the active buck state and the active boost state do not exist simultaneously.

7. The switching power converter of claim 2 wherein:
the first signal comprises an active buck state and an inactive buck state;
the second signal comprises an active boost state and an inactive boost state;
the first circuitry further comprises:
a first buck switching element comprising a first buck terminal and a second buck terminal, wherein:
the first buck terminal is adapted to receive the DC input signal;
the second buck terminal is coupled to the storage input; and
the first buck switching element is closed during the inactive buck state and open during the active buck state; and
a second buck switching element comprising a third buck terminal and a fourth buck terminal, wherein:
the third buck terminal is coupled to the second buck terminal;
the fourth buck terminal is coupled to the common node; and
the second buck switching element is open during the inactive buck state and closed during the active buck state; and the second circuitry further comprises:
a first boost switching element comprising a first boost terminal and a second boost terminal, wherein:
the first boost terminal is adapted to provide the DC output signal;
the second boost terminal is coupled to the storage output; and
the first boost switching element is closed during the inactive boost state and open during the active boost state; and
a second boost switching element comprising a third boost terminal and a fourth boost terminal, wherein:
the third boost terminal is coupled to the second boost terminal;
the fourth boost terminal is coupled to the common node; and
the second boost switching element is open during the inactive boost state and closed during the active boost state.

8. The switching power converter of claim 7 wherein:
the first buck switching element and the second buck switching element are not closed simultaneously; and
the first boost switching element and the second boost switching element are not closed simultaneously.

9. The switching power converter of claim 7 wherein:
the first buck switching element further comprises a first buck transistor element;
the second buck switching element further comprises a second buck transistor element;
the first boost switching element further comprises a first boost transistor element; and
the second boost switching element further comprises a second boost transistor element.

10. The switching power converter of claim 2 wherein:
the control circuitry is further adapted to receive a DC output setpoint signal;
the control circuitry is further adapted to provide a scaled DC output setpoint signal;
a scaled setpoint is equal to a magnitude of the DC output setpoint signal times a scaling factor;
a magnitude of the scaled DC output setpoint signal is equal to the scaled setpoint plus an offset; and
the DC output signal is substantially regulated such that a magnitude of the DC output signal is approximately equal to the magnitude of the scaled DC output setpoint signal.

11. The switching power converter of claim 10 wherein the control circuitry further comprises a voltage error integrator adapted to:
receive the DC output signal;
receive the scaled DC output setpoint signal; and
provide the common duty-cycle setpoint signal based on a difference between the magnitude of the DC output signal and the magnitude of the scaled DC output setpoint signal.

12. The switching power converter of claim 11 further comprising:
a buck duty-cycle regulator adapted to:
receive the common duty-cycle setpoint signal;
receive the common duty-cycle timing signal;
provide the first signal; and
regulate the first switching duty-cycle; and
a boost duty-cycle regulator adapted to:
receive the common duty-cycle setpoint signal;

receive the common duty-cycle timing signal;
provide the second signal; and
regulate the second switching duty-cycle.

13. The switching power converter of claim 12 wherein the buck duty-cycle regulator further comprises a buck offset error circuit adapted to locate the buck zone such that the buck zone does not overlap with the boost zone.

14. The switching power converter of claim 12 wherein the boost duty-cycle regulator further comprises a boost offset error circuit adapted to locate the boost zone such that the boost zone does not overlap with the buck zone.

15. The switching power converter of claim 12 wherein:
the buck duty-cycle regulator further comprises a buck duty-cycle error integrator adapted to:
receive the common duty-cycle setpoint signal;
receive the first signal; and
provide a buck switching threshold signal based on the common duty-cycle setpoint signal and the first signal; and
the boost duty-cycle regulator further comprises a boost duty-cycle error integrator adapted to:
receive the common duty-cycle setpoint signal;
receive the second signal; and
provide a boost switching threshold signal based on the common duty-cycle setpoint signal and the second signal.

16. The switching power converter of claim 15 wherein:
the buck duty-cycle regulator further comprises a buck duty-cycle comparator adapted to:
receive the common duty-cycle timing signal;
receive the buck switching threshold signal; and
provide a buck duty-cycle start signal based on the common duty-cycle timing signal and the buck switching threshold signal; and
the boost duty-cycle regulator further comprises a boost duty-cycle comparator adapted to:
receive the common duty-cycle timing signal;
receive the boost switching threshold signal; and
provide a boost duty-cycle start signal based on the common duty-cycle timing signal and the boost switching threshold signal.

17. The switching power converter of claim 16 wherein:
the control circuitry is further adapted to receive a common cycle start signal having a first frequency such that the common duty-cycle timing signal has the first frequency;
the buck duty-cycle regulator further comprises a buck duty-cycle flip-flop circuit adapted to:
receive the buck duty-cycle start signal;
receive the common cycle start signal; and
provide the first signal based on the buck duty-cycle start signal and the common cycle start signal; and
the boost duty-cycle regulator further comprises a boost duty-cycle flip-flop circuit adapted to:
receive the boost duty-cycle start signal;
receive the common cycle start signal; and
provide the second signal based on the boost duty-cycle start signal and the common cycle start signal.

18. The switching power converter of claim 17 wherein:
the first signal comprises an active buck state and an inactive buck state;
the second signal comprises an active boost state and an inactive boost state;
the buck duty-cycle flip-flop circuit is further adapted to receive the second signal such that when in the active boost state, the buck duty-cycle flip-flop circuit inhibits entry into the active buck state; and
the boost duty-cycle flip-flop circuit is further adapted to receive the first signal such that when in the active buck state, the boost duty-cycle flip-flop circuit inhibits entry into the active boost state.

19. The switching power converter of claim 2 wherein the switching power converter is part of power supply circuitry in a battery powered device.

20. A method of controlling a switching power converter comprising:
receiving a DC output signal and a common duty-cycle timing signal;
generating a common duty-cycle setpoint signal based on the DC output signal and an output setpoint, the common duty-cycle setpoint signal having a boost zone corresponding to a boost operating mode and a buck zone corresponding to a buck operating mode, wherein the boost zone and the buck zone do not overlap;
when in the buck operating mode, providing a first signal having a first switching duty-cycle based on the common duty-cycle setpoint signal and the common duty-cycle timing signal to control buck switching circuitry; and
when in the boost operating mode, provide a second signal having a second switching duty-cycle based on the common duty-cycle setpoint signal and the common duty-cycle timing signal to control boost switching circuitry,
wherein the switching power converter substantially regulates the DC output signal based on the output setpoint.

* * * * *